United States Patent
Classen

(10) Patent No.: US 8,955,379 B2
(45) Date of Patent: Feb. 17, 2015

(54) YAW RATE SENSOR AND METHOD FOR MANUFACTURING A MASS ELEMENT

(75) Inventor: Johannes Classen, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 247 days.

(21) Appl. No.: 13/179,157

(22) Filed: Jul. 8, 2011

(65) Prior Publication Data

US 2012/0024059 A1 Feb. 2, 2012

(30) Foreign Application Priority Data

Jul. 27, 2010 (DE) .......................... 10 2010 038 461

(51) Int. Cl.
*G01C 19/56* (2012.01)
*G01C 19/5747* (2012.01)

(52) U.S. Cl.
CPC .................................. *G01C 19/5747* (2013.01)
USPC ..................................... 73/504.12; 73/504.14

(58) Field of Classification Search
USPC ............... 73/504.12, 504.14, 504.04, 504.15, 73/504.02
See application file for complete search history.

(56) References Cited

U.S. PATENT DOCUMENTS

| | | | | |
|---|---|---|---|---|
| 4,574,327 A * | 3/1986 | Wilner | ...................... | 361/283.4 |
| 5,228,341 A * | 7/1993 | Tsuchitani et al. | ......... | 73/514.36 |
| 5,350,189 A * | 9/1994 | Tsuchitani et al. | ........... | 280/735 |
| 5,392,650 A * | 2/1995 | O'Brien et al. | ............ | 73/514.18 |
| 6,041,653 A * | 3/2000 | Ichikawa et al. | ............ | 73/514.32 |
| 6,561,029 B2 * | 5/2003 | Folkmer et al. | ............ | 73/504.14 |
| 6,752,017 B2 * | 6/2004 | Willig et al. | ............... | 73/504.04 |
| 6,928,873 B2 * | 8/2005 | Chen et al. | ................. | 73/504.04 |
| 7,059,190 B2 * | 6/2006 | Sakai et al. | ................ | 73/514.32 |
| 7,134,337 B2 * | 11/2006 | Willig et al. | ............... | 73/504.12 |
| 7,197,928 B2 * | 4/2007 | Chen et al. | ................. | 73/504.04 |
| 7,302,847 B2 * | 12/2007 | Ito et al. | ..................... | 73/504.14 |
| 7,316,161 B2 * | 1/2008 | Willig et al. | ............... | 73/504.12 |
| 7,546,768 B2 * | 6/2009 | Mase et al. | ..................... | 73/493 |
| 7,578,186 B2 * | 8/2009 | Matsuhisa | .................. | 73/504.12 |
| 7,631,558 B2 * | 12/2009 | Diem | ......................... | 73/504.12 |
| 8,365,595 B2 * | 2/2013 | Geiger et al. | .............. | 73/504.14 |
| 8,413,507 B2 * | 4/2013 | Fujii et al. | ................. | 73/504.12 |
| 8,443,668 B2 * | 5/2013 | Ohms et al. | ................ | 73/504.12 |
| 8,453,502 B2 * | 6/2013 | Meisel | ....................... | 73/504.12 |
| 2010/0192690 A1 * | 8/2010 | Classen et al. | ............. | 73/504.12 |

* cited by examiner

*Primary Examiner* — Helen Kwok
(74) *Attorney, Agent, or Firm* — Kenyon & Kenyon LLP

(57) ABSTRACT

A yaw rate sensor includes a drive device, at least one mass element which is connected to the drive device, and at least one detection electrode for detecting a motion of the mass element. The mass element has a base layer and at least one web which is situated on the base layer. Also, a method for manufacturing a mass element.

7 Claims, 5 Drawing Sheets

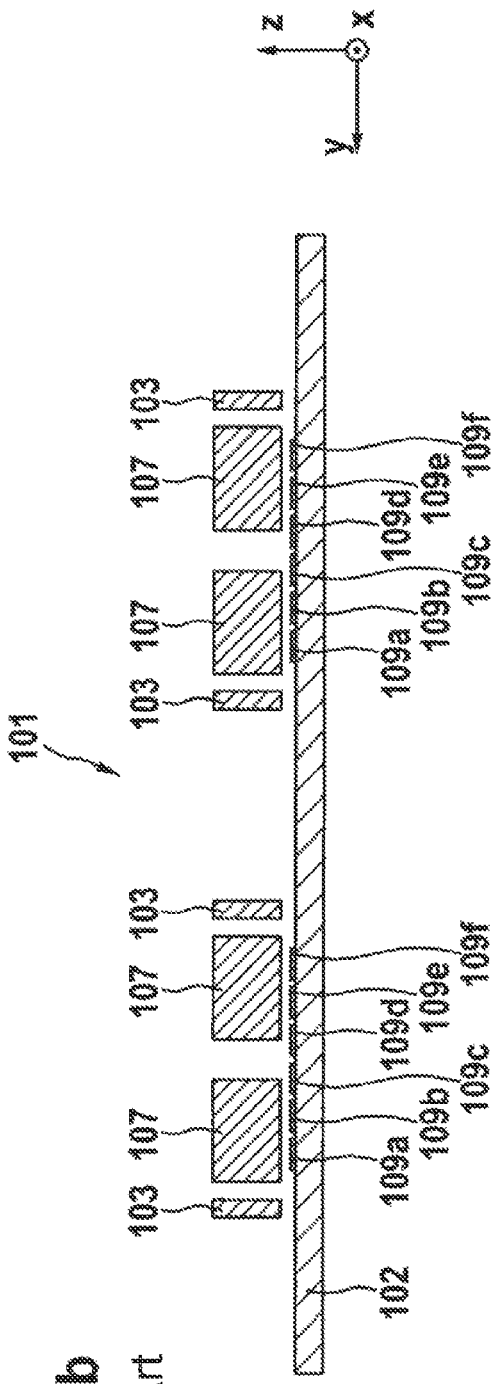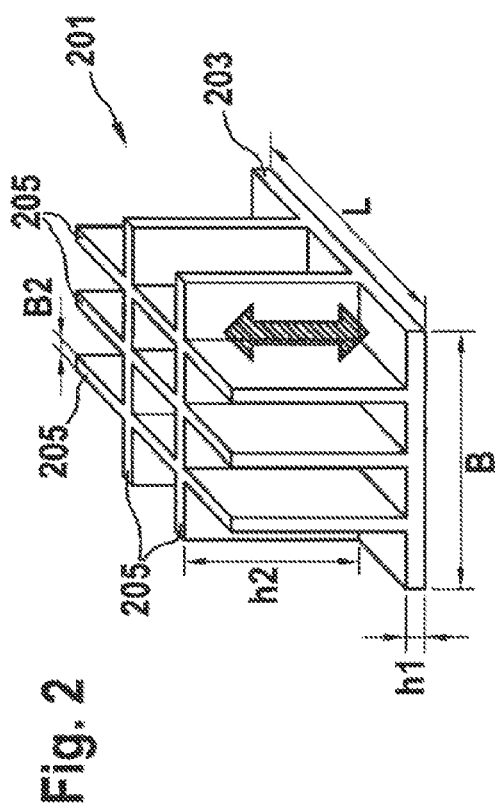

YAW RATE SENSOR AND METHOD FOR MANUFACTURING A MASS ELEMENT

BACKGROUND INFORMATION

It is known to mount a yaw rate sensor on a rotatable body in order to measure a yaw rate of a rotary motion of the body. Known yaw rate sensors usually have a substrate on which one or multiple electrodes is/are situated. In addition, one or multiple detection masses is/are suspended on the substrate in such a way that the detection masses are located above the electrodes. The detection masses are suspended in the manner of a trampoline, so to speak. The detection masses are usually made of a solid material. When the detection mass or the detection masses is/are then excited to a vibration parallel to the substrate plane with the aid of a drive, a rotation about an axis which is in the substrate plane and is situated orthogonally with respect to the vibration direction of the detection masses, results in a deflection of the detection masses perpendicular to the substrate plane due to the Coriolis force. Consequently, the distance between the electrodes and the detection masses also changes. In this regard, the corresponding capacitance also changes. This change may be detected and converted into an appropriate yaw rate of the rotary motion of the body. The deflection of a detection mass is proportional to the Coriolis force acting on the detection mass. Yaw rate sensors in which the detection masses move out of the substrate plane when a Coriolis force is present may also be referred to as out-of-plane yaw rate sensors.

The above yaw rate sensors are generally acted upon by electrical voltages via the electrodes, in particular for electrostatic regenerative feedback; i.e., in fully resonant operation the detection mode is reduced to the frequency of the drive mode in order to increase the signal-to-noise ratio, and to compensate for the quadrature, i.e., the mechanical and/or electrical crosstalk of the drive motion in the detection path of the sensor element.

For applications in the automotive field, for example in electronic stability program (ESP) systems, for rollover sensing, or also in navigation systems, it is necessary to increase operating frequency $f_a$ of the yaw rate sensor to 15 kHz or even to 20 kHz to 40 kHz, since at these high frequencies interfering vibrations hardly ever occur in the automobile, and the yaw rate sensor therefore has a very high level of robustness with respect to interfering excitations. However, the increase in the operating frequency is accompanied by an increase in mechanical spring stiffness k of the yaw rate sensor. On the other hand, since for a yaw rate sensor which detects out-of-plane, electrode surface areas for the regenerative feedback and quadrature compensation effects do not increase in the same proportion as the spring stiffness, for the same applied voltages this results in a reduced regenerative feedback capability, i.e., the reduction in the detection frequency divided by the square of the regenerative feedback voltage, or a reduced quadrature compensation capability, i.e., the compensated quadrature divided by the square of the compensation voltage. This may result in considerable yield losses, since it is no longer possible for all production fluctuations, which result in variations in the necessary regenerative feedback and quadrature compensation effects, to be compensated for via the voltage level which is available in the evaluation circuit.

One option for preventing spring stiffness k of the yaw rate sensor from increasing despite a higher operating frequency $f_a$ is to reduce mass m of the detection masses, since $f_a=(k/m)^{1/2}/2\pi$. However, for sensors according to the related art, whose detection masses are structured from a single micromechanical layer, or for detection masses made of a solid material, a reduction in mass is accompanied by a reduction in the available electrode surface areas. Thus, the ratio of electrode surface area to mechanical stiffness, and thus also the regenerative feedback and quadrature compensation capability, is not improved as a result.

The known yaw rate sensors also have the disadvantage that in addition to their useful modes, i.e., the drive mode and the detection mode, they have additional vibration modes, so-called spurious modes. When such spurious modes are excited via electrical or mechanical disturbances during operation of the yaw rate sensor, false signals may appear in the output signal.

SUMMARY OF THE INVENTION

An object of the present invention, therefore, is to provide a yaw rate sensor which overcomes the known disadvantages and which effectively suppresses spurious modes in particular at high frequencies, thus avoiding false signals.

Moreover, an object of the present invention is to provide a method for manufacturing a mass element which may be used in particular in the yaw rate sensor according to the present invention.

These objects are achieved by a yaw rate sensor according to the present invention and by a method according to the present invention.

The present invention encompasses the concept of providing a yaw rate sensor which includes a drive device. According to the present invention, the drive device is connected to at least one mass element; i.e., one mass element or also multiple mass elements may be provided. Two mass elements are preferably provided. According to the present invention, the mass element has a base layer on which at least one web is situated. The web may have a square shape, for example. The web is preferably situated on the base layer at a 90° angle relative thereto.

In addition, at least one detection electrode is provided in the yaw rate sensor. The detection electrode detects a motion of the mass element by capacitively detecting a change in the distance between the mass element and the detection electrode. The detection electrode is preferably situated beneath the base layer, separate from the mass element. For example, multiple detection electrodes, in particular two detection electrodes, may also be provided. In one exemplary embodiment of the present invention, additional electrodes, in particular six electrodes, may be provided. The additional electrodes may be used, for example, for electrostatic regenerative feedback and/or for position control of the mass element. In one preferred embodiment of the present invention, the yaw rate sensor is a micromechanical yaw rate sensor.

The drive device drives the at least one mass element for a linear vibration. In the case of two mass elements, the drive device may drive the two mass elements, for example, toward an antiparallel collinear drive motion. This means that the first mass element and the second mass element vibrate phase-shifted by 180° (antiparallel) with respect to one another. Therefore, such vibrating motions are also frequently referred to as vibrating motions in phase opposition, or also as an antiparallel mode.

When the yaw rate sensor undergoes a rotational motion about a rotational axis which is not parallel to the vibration direction of the mass elements, and at the same time the two mass elements are excited to undergo their antiparallel vibrating motions, Coriolis forces act upon the two vibrating mass elements. As a result of the Coriolis forces, the two mass elements are each deflected perpendicularly to their vibration direction. The two mass elements are deflected in opposite directions due to the antiparallelism of the vibrating motions of the two mass elements. Such an opposite vibration direction may also be referred to as an antiparallel detection vibration. The distance between the detection electrode and the mass elements changes as a result of this deflection perpendicular to the vibrating motion. Therefore, the corresponding capacitance also changes. This change in the capacitance may subsequently be detected and converted into a yaw rate.

The yaw rate sensor according to the present invention having two mass elements is described below. However, the present invention is not limited thereto. In the simplest case, one mass element is sufficient.

In addition, the three spatial axes, i.e., the x axis, the y axis, and the z axis, are defined as follows for the discussion below. The y axis is parallel to the vibration of the mass elements; i.e., the drive device excites the mass elements to undergo a drive vibration, in particular an antiparallel collinear drive vibration, along the y axis. The x axis is orthogonal to the y axis and is situated in the plane of the drive vibration. The z axis is orthogonal to the x and the y axes, and is orthogonal to the plane of the drive vibration.

According to the present invention, at least one web is situated on the base layer of the mass element. Multiple webs are preferably situated on the base layer. In particular, the webs are situated parallel to one another. In addition, in one preferred specific embodiment of the present invention it may be provided that the webs form a grid shape, i.e., that the webs are arranged in a grid shape. For example, multiple webs may be situated parallel to one another, with additional webs, once again parallel to one another, being situated at a 90° angle thereto. It may be provided that the webs cross or intersect. The webs penetrate one another, in a manner of speaking. In this way, a grid shape or a lattice shape is formed. The webs preferably have a height between 10 μm and 60 μm, in particular between 10 μm and 40 μm. It may be provided, for example, that the webs all have the same height. However, it may also be provided that the webs each have a different height. In another exemplary embodiment of the present invention, the width or thickness of the webs is between 1 μm and 8 μm, and in particular the width is 2 μm. In yet another exemplary specific embodiment of the present invention, the distance between the webs in each case may be between 10 μm and 100 μm, in particular between 20 μm and 100 μm. Here as well, the distances between the webs may be the same, or also different. In yet another exemplary specific embodiment, the height of the base layer is between 1 μm and 8 μm, preferably 2 μm. A width of the base layer may be, for example, between 10 μm and 1000 μm, in particular 20 μm.

According to one preferred embodiment of the present invention, a substrate is provided, on which the at least one mass element is vibratably mounted. The at least one mass element is preferably suspended on the substrate with the aid of suspension means. The suspension means include springs and/or anchors in particular. For example, the anchors are situated on the substrate, and the springs connect the anchors to the at least one mass element.

Moreover, the present invention encompasses the concept of providing a method for manufacturing a mass element, it being possible to use the mass element in particular in the yaw rate sensor according to the present invention. A base layer is initially deposited on a substrate. An oxide layer is then deposited on the base layer. The oxide layer is then opened in predetermined regions. A web layer is then deposited on the oxide layer, whereby the web layer connects to the base layer in the opened regions. As a result, a web is formed on the base layer. On the unopened regions of the base layer the web layer rests on the oxide layer.

According to one exemplary specific embodiment of the method, the web layer is structured. For example, the web layer may be structured with the aid of trenches. In particular, a web layer grid is formed. It may be provided in particular that the web layer is removed from the unopened regions with the aid of an etching process, for example. The oxide layer results in an etching stop above the base layer.

In another exemplary specific embodiment of the present invention, a sacrificial oxide layer is applied to the substrate before the base layer is deposited. It may be provided in particular that the sacrificial oxide layer is removed after the web has been formed. For example, the sacrificial oxide layer may be removed using gaseous HF. This has the particular effect that a micromechanical structure is exposed. In another exemplary embodiment it may be provided that the base layer is structured, for example by forming one or multiple perforation holes in the base layer. In particular, the gaseous HF may pass through the perforation holes to the sacrificial oxide layer and etch away same. These perforation holes may also be referred to as HF etching access holes.

According to another preferred specific embodiment of the present invention, the structuring may also be achieved using a hard mask technique. The base layer is not directly structured after the deposition; instead, the oxide layer deposited on the base layer is used as a mask, and is subsequently opened not only at the sites where the webs are to grow, but also at the sites for the HF etching access holes. Further processing proceeds similarly as described above; i.e., the HF etching access holes are implemented via the trench process.

Those skilled in the art are familiar with other sacrificial and functional layers. In this regard, the two manufacturing methods described above are only examples, and are not to be construed as limiting.

BRIEF DESCRIPTION OF THE DRAWINGS

FIG. 1B shows a sectional view of the yaw rate sensor from FIG. 1A.

FIG. 2 shows a perspective view of a mass element.

DETAILED DESCRIPTION

Figure 1A:
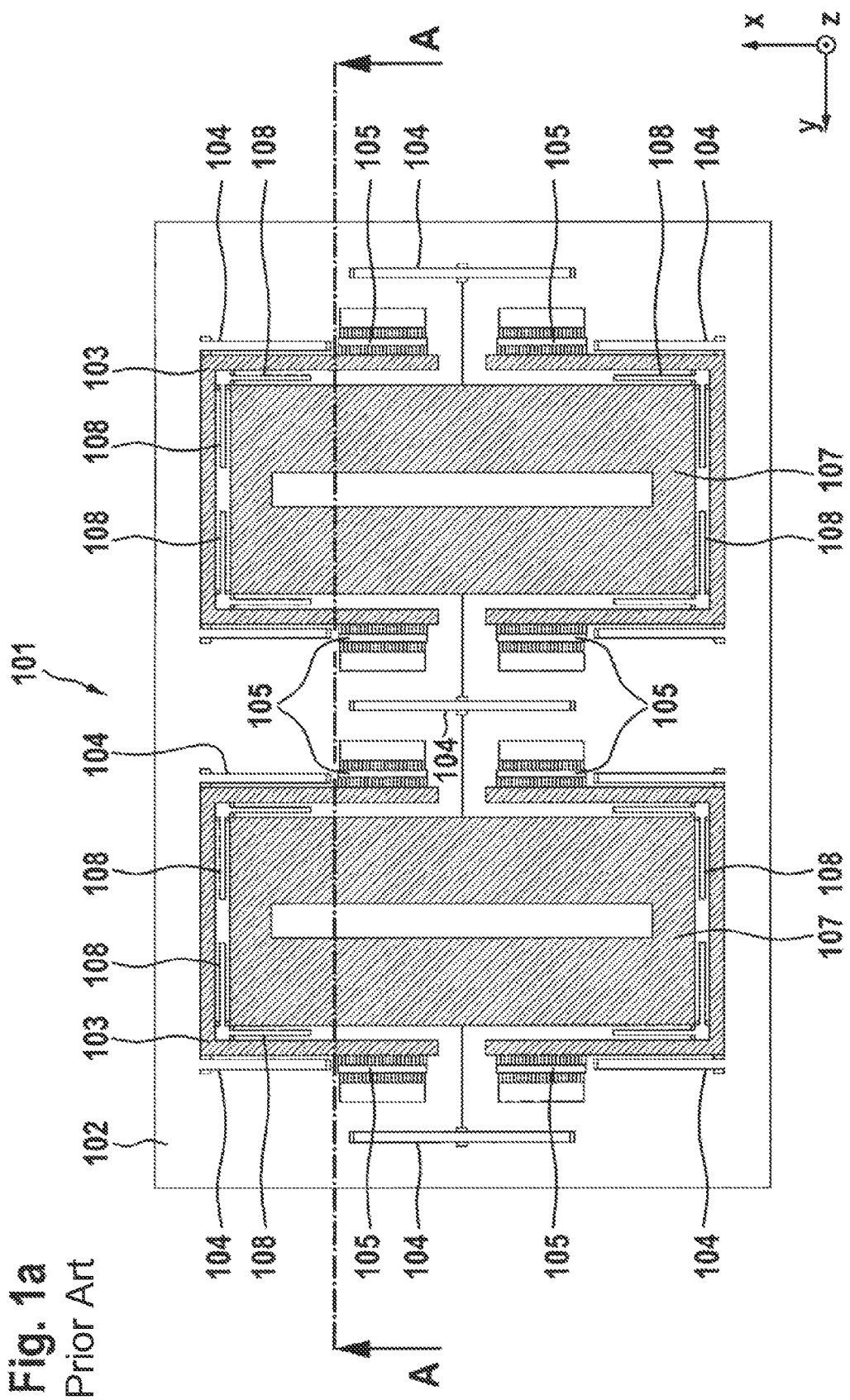
FIG. 1A shows a yaw rate sensor according to the related art.

FIG. 1A shows a yaw rate sensor 101 according to the related art. Yaw rate sensor 101 includes a substrate 102 which is situated in the plane of the drawing. Substrate 102 has a rectangular shape. In another specific embodiment which is not shown, substrate 102 may also have a square shape.

The x and y axes are also situated in the plane of the drawing. The z axis is perpendicular to the plane of the drawing (see the illustrated coordinate system). Situated on substrate 102 is a drive device which includes two drive frames 103 which are suspended on substrate 102 in a trampoline-like manner with the aid of multiple suspension means 104.

Suspension means 104 preferably include springs and anchors. In particular, the anchors are situated on substrate 102, and the springs then connect the anchors to drive frames 103. The two drive frames 103 have a rectangular shape, both drive frames 103 having a frame recess along the axis of symmetry formed parallel to the y axis. A detection mass 107 is situated in each drive frame 103. Detection masses 107 together with multiple coupling elements 108 are situated at the inner sides of drive frames 103. Coupling means 108 preferably include multiple springs, in particular U springs. Detection masses 107 are made of a solid material, and an elongated rectangular recess which may also be referred to as a slot is provided in each detection mass.

Suspension means 104, which suspend detection masses 107 on substrate 102, are guided through the frame recesses.

The drive device also includes multiple comb electrodes 105 which are connected to drive frames 103. Comb electrodes 105 drive drive frames 103 for an oppositely directed antiparallel drive motion along the y axis. Thus, detection masses 107 are also excited for an antiparallel and collinear vibration along the y axis due to the coupling between detection masses 107 and drive frames 103 with the aid of coupling means 108.

Multiple electrodes 109a through 109f are also provided on substrate 102, each electrode being situated beneath detection masses 107 (also see FIG. 1B). Electrodes 109a through 109f may also be referred to as base electrodes. Electrodes 109a through 109f are preferably situated on the substrate. However, it may also be provided that electrodes 109a through 109f are integrated into the substrate. In particular when substrate 102 is a conductive supporting plate, electrodes 109a through 109f may be integrated into the printed conductors. Electrodes 109a through 109f may in particular perform various functions. In addition to yaw rate detection, these electrodes may also be used for electrostatic regenerative feedback and for position control of the sensor structure. In particular, electrodes 109c and 109d, which are situated beneath the slot in detection mass 107, are able to exert vertically acting forces on the sensor structure and thus compensate for the quadrature of the sensor element when appropriate direct current voltages are applied. For positive quadrature, electrode 109d, for example, is acted upon by a voltage, and for negative quadrature, electrode 109c, for example, is acted upon by a voltage. Electrode 109a may be used for yaw rate detection, for example. This means that a change in distance between electrode 109a and associated detection mass 107 is capacitively detected. In this regard, electrode 109a may also be referred to as a detection electrode. In another exemplary embodiment not shown, electrode 109b may be used in addition or as an alternative to electrode 109a for the yaw rate detection. In general, any of electrodes 109a through 109f may be used for yaw rate detection.

When yaw rates occur about the x axis, a Coriolis force acts out of plane, i.e., in the direction of the z axis. This causes both detection masses 107 to be deflected vertically, i.e., in the direction of the z axis and thus out of the plane of the drawing. A distance between detection masses 107 and electrodes 109a through 109f changes due to this vertical deflection. In this regard, the corresponding capacitance also changes. This change in capacitance may then be detected with the aid of an evaluation electronics system, not shown, and converted into a yaw rate.

FIG. 1B shows a sectional view of yaw rate sensor 101 along dashed line A-A in FIG. 1A. For the sake of clarity, not all elements from FIG. 1A are shown in FIG. 1B.

FIG. 2 shows a perspective view of a detail of a mass element 201 according to the present invention, which may also be referred to as a detection mass element. Mass element 201 according to the present invention, or detection mass element, may be used instead of detection masses 107 in the sensor structure shown in FIGS. 1A and 1B. Mass element 201 includes a base layer 203 and multiple webs 205 situated on base layer 203. Base layer 203 has a rectangular shape, with a width B, a length L, and height or thickness h1. Thickness or height h1 of base layer 203 is in particular several microns, in particular between 1 μm and 8 μm, preferably 2 μm. Width B is between 10 μm and 1000 μm, preferably between 100 μm and 600 μm. Length L may have the same values as width B.

A number of multiple webs 205 are situated parallel to longitudinal side L of base layer 203 and parallel to one another. In the exemplary embodiment of mass element 201 according to the present invention shown here, three such webs 205 are provided. However, in other exemplary embodiments not shown, for example, more than three such webs may be provided. In particular, a distance between the webs may be between 10 μm and 110 μm, preferably between 20 μm and 100 μm. Corresponding required width B of base layer 203 is then appropriately adapted. Two webs 205 are situated perpendicularly to webs 205 situated parallel to longitudinal side L, and are situated parallel to broad side B of base layer 203, so that webs 205 which are situated parallel to broad side B intersect or cross webs 205 situated parallel to longitudinal side L, thus forming a lattice structure or grid structure. Webs 205 have a height h2 which may preferably be between 10 μm and 60 μm, in particular between 11 μm and 40 μm. Webs 205 also have a width or thickness B2 which may be several microns, preferably between 1 μm and 10 μm, in particular 2 μm. Here as well, a distance between webs 205 situated parallel to broad side B may be between 20 μm and 100 μm. Corresponding required length L of base layer 203 is then appropriately adapted. In particular, heights h2, widths B2, and the number of webs 205 are adapted to shift the spurious mode spectrum to a high frequency range. Webs 205 provide mechanical stabilization of mass element 201. In particular, base layer 203 provides an electrode surface area which, together with electrodes 109a through 109f stationarily mounted on substrate 102, forms a capacitor. Mass element 201 is formed as a two-layer structure in a manner of speaking.

Figure 3:
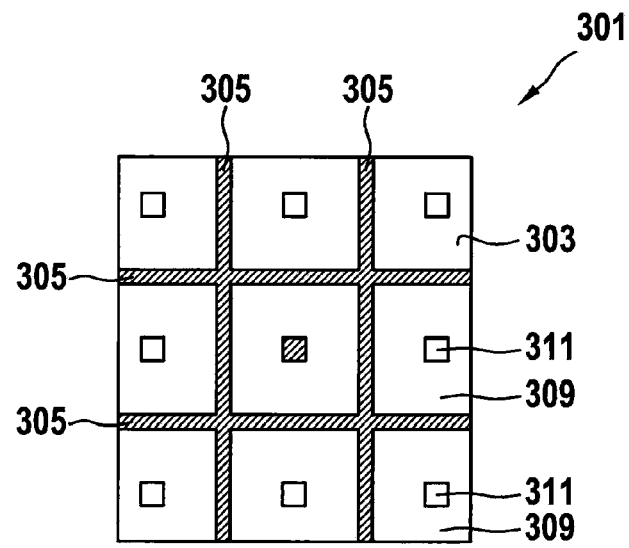
FIG. 3 shows a top view of another mass element.

FIG. 3 shows a top view of another mass element 301 according to the present invention, having a base layer 303 and webs 305 situated thereon in a lattice or grid structure. Due to the lattice or grid structure provided according to the present invention, cells 309 are formed within the grid. An etching hole 311 is provided in each cell 309. In one exemplary embodiment not shown, multiple etching holes 311 are provided in each cell 309. Etching holes 311 are used in particular for removing a sacrificial layer (oxide) beneath base layer 303, i.e., for exposing the micromechanical structure.

Figure 4:
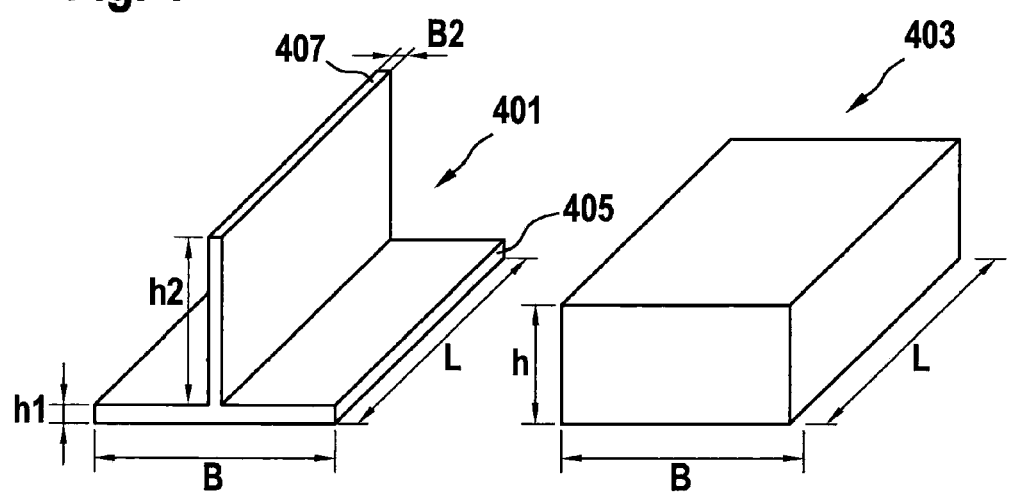
FIG. 4 shows a perspective illustration of a mass element in comparison to a known detection mass.

FIG. 4 shows another preferred specific embodiment of a mass element 401 according to the present invention (left) in comparison to a detection mass 403, made of a solid material, according to the related art (right). Here, mass element 401 according to the present invention has a base layer 405 and a web 407 situated thereon. Width B, in the present case 20 μm, and length L (in the present case, any desired value, since there is no influence on the normalized values) of mass element 401 and of detection mass 403 are the same here for better comparison. In this example, height h of detection mass 403 is 11 μm; i.e., detection mass 403 has a homogeneous layer thickness of 11 μm. In the exemplary embodiment shown here, base layer 405 of mass element 401 according to the present invention has a height h1 of 2 μm. Width B2 of web 407 is 2 μm in the present case. Height h2, i.e., the thickness, of web 407 has been varied between 11 μm and 40 μm for the following computations.

Figure 5:
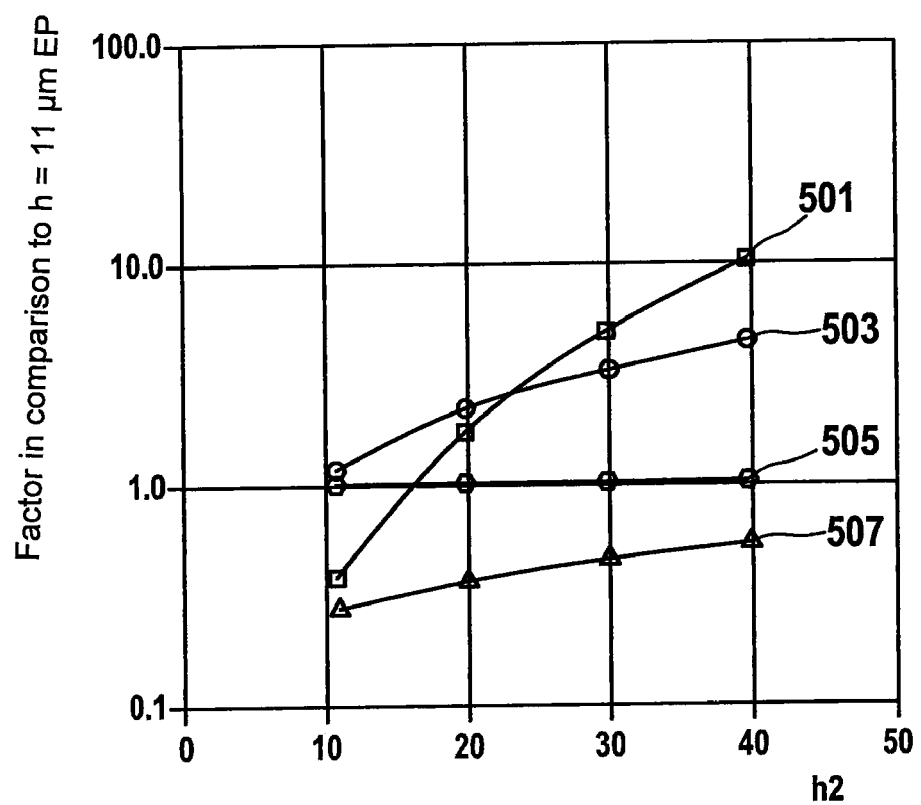
FIG. 5 shows a graph which shows results of analytical computations for the mass element according to the present invention shown in FIG. 4.

FIG. 5 shows the analytical computations for mass element 401 according to the present invention illustrated on the left side of FIG. 4. The values of various physical parameters resulting from the analytical computations have been normalized to corresponding values for detection mass 403 having a layer thickness of 11 μm. Thus, the factor is plotted in comparison to the standard mass element over height h2 of web 407 in μm. The following physical parameters were computed: Z flexural strength 501, the natural frequency of plate mode 503, capacitance 505, and mass, i.e., spring stiffness, 507.

With regard to electrodes 109a through 109f situated beneath mass element 401 (see FIGS. 1A and 1B), capacitance 505 of mass element 401 according to the present invention is unchanged with respect to the reference case, i.e., with respect to standard mass element 403, and is also independent of the thickness of webs 407.

Mass 507 of mass element 401 is smaller than in the reference case by a factor of approximately 2 to 3, depending on height h2, i.e., the thickness. In order to maintain the operating frequency $$f_A = \frac{\sqrt{\frac{k}{m}}}{2\pi}$$

a correspondingly smaller spring stiffness may thus be selected via the spring design. This advantageously results in higher values for the regenerative feedback and quadrature compensation capability of a yaw rate sensor having mass element 401 according to the present invention. The yield is also advantageously improved.

Z flexural strength 501 of mass element 401, which may also be referred to as a T profile mass element, is greater than for the reference case having a homogeneous layer thickness of 11 μm, in particular for a height h2>16 μm.

Relation of Z flexural strength 501 to mass 507 of mass element 401 or to reference mass 403 results in a measure for natural frequencies 503 of the plate modes, in particular the out-of-plane plate modes. For a height h2 of 11 μm, the value is slightly increased (by approximately 1.2), and increases to greater than 4 when a thickness of 40 μm is used. Thus, in particular when increased thicknesses or heights of webs 407 are used, an enormous shift of the spurious mode spectrum to a higher frequency range is advantageously made possible.

Another advantage of the mass element according to the present invention is that, due to the lower mass and therefore also the reduced spring stiffness of the drive springs, lower drive voltages are required. A moderate reduction in the drive voltage results even when a thickness or height of webs 407 of 11 μm is used. This effect is further intensified when the height of the webs is increased, since the drive forces increase more than the stiffness and the clamping forces as the thickness or height of the webs increases.

Figure 6:
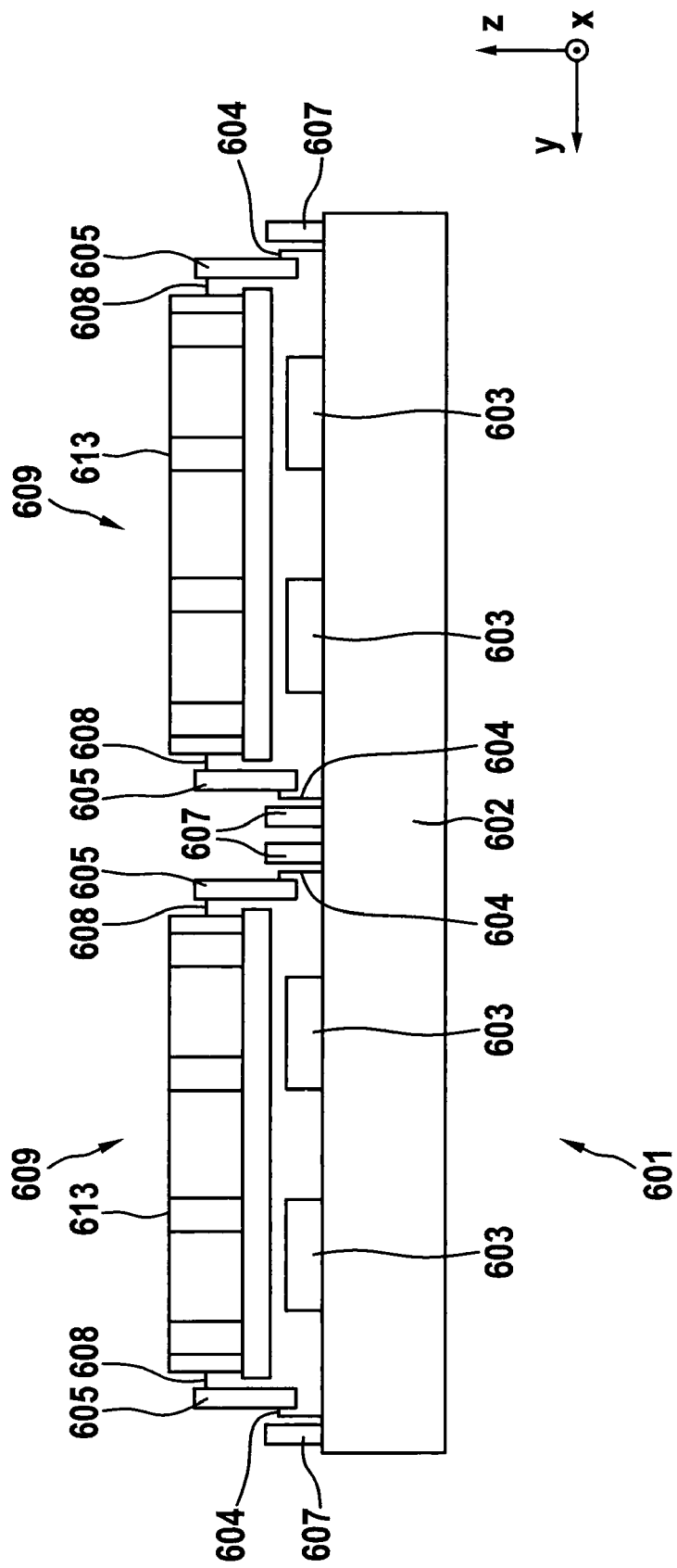
FIG. 6 shows a yaw rate sensor according to the present invention.

FIG. 6 shows another yaw rate sensor 601 having two mass elements 609 according to the present invention. In the present case, yaw rate sensor 601 includes a substrate 602. Substrate 602 is provided as a supporting plate, in particular a conductive supporting plate. Electrodes 603 are situated on substrate 602. A mass element 609 is suspended, in particular in a trampoline-like manner, above each of the two electrodes 603. Mass elements 609 include a base layer 611 on which multiple webs 613 are provided in a grid or lattice structure. In addition, drive frames 605 are coupled to substrate 602 via suspension means 604, drive frames 605 being coupled to mass elements 609 with the aid of coupling means 608. Suspension means 604 include in particular springs and anchors. The anchors are preferably provided on substrate 602, and coupling to and suspension on substrate 602 are subsequently achieved with the aid of the springs.

Comb electrodes 607 which are situated on the substrate, and which in particular are situated at a distance from drive frames 605, drive drive frames 605 for a drive motion in the opposite direction, so that due to the coupling between drive frames 605 and mass elements 609, mass elements 609 are likewise driven for an oppositely directed collinear and antiparallel vibration. In the exemplary embodiment shown in FIG. 6, two electrodes 603 are provided beneath each of mass elements 609. In another exemplary embodiment not shown, it is also possible to provide six electrodes beneath each of mass elements 609. In another exemplary embodiment not shown, electrodes 603 may also be integrated into substrate 602 or integrally formed.

What is claimed is:

1. A yaw rate sensor comprising:
   a drive device;
   at least one mass element which is connected to the drive device, the mass element including a base layer and at least one web which is situated on the base layer forming a lattice structure such that cells are formed within the lattice structure, and at least one etching hole is provided in each cell; and
   at least one detection electrode for detecting a motion of the mass element;
   wherein the drive device includes at least one drive frame.

2. The yaw rate sensor according to claim 1, wherein multiple webs are situated in a grid shape on the base layer.

3. The yaw rate sensor according to claim 1, further comprising a substrate on which the at least one mass element is vibratably mounted.

4. The yaw rate sensor according to claim 3, wherein the substrate is a conductive supporting plate, which includes the at least one detection electrode.

5. A yaw rate sensor comprising:
   a drive device;
   at least one mass element which is connected to the drive device, the mass element including a base layer and at least one web which is situated on the base layer forming a lattice structure such that cells are formed within the lattice structure, and at least one etching hole is provided in each cell; and
   at least one detection electrode for detecting a motion of the mass element;
   wherein the drive device includes drive frames coupled to a substrate via at least one of springs and anchors.

6. The yaw rate sensor according to claim 5, wherein the drive frames are coupled to the mass element via coupling elements including springs.

7. The yaw rate sensor according to claim 6, wherein the springs are U-springs.

* * * * *